United States Patent
Eggert et al.

(10) Patent No.: US 10,291,723 B2
(45) Date of Patent: *May 14, 2019

(54) EXTERNALLY INITIATED APPLICATION SESSION ENDPOINT MIGRATION

(71) Applicant: NetApp Inc., Sunnyvale, CA (US)

(72) Inventors: Lars R. Eggert, Munich (DE); Naman G. Muley, Research Triangle Park, NC (US); Preetam Patil, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/386,661

(22) Filed: Dec. 21, 2016

(65) Prior Publication Data
US 2017/0104830 A1 Apr. 13, 2017

Related U.S. Application Data

(63) Continuation of application No. 14/204,117, filed on Mar. 11, 2014, now Pat. No. 9,635,114.

(30) Foreign Application Priority Data

Jan. 24, 2014 (IN) .......................... 268/MUM/2014

(51) Int. Cl.
*H04L 29/08* (2006.01)
*H04L 29/12* (2006.01)

(52) U.S. Cl.
CPC ........ *H04L 67/147* (2013.01); *H04L 61/2521* (2013.01); *H04L 67/28* (2013.01)

(58) Field of Classification Search
CPC ..... H04W 92/02; H04W 88/12; H04W 88/06; H04W 60/06; H04W 76/02; H04W 8/26;
(Continued)

(56) References Cited

U.S. PATENT DOCUMENTS 6,601,101 B1 * 7/2003 Lee .................. H04L 67/1008
709/202
6,826,613 B1 * 11/2004 Wang .................. G06F 3/0607
709/202
(Continued)

OTHER PUBLICATIONS

"SockMi: A Solution for Migrating TCP/IP Connections," 2007, Massimo Bernaschi, Francesco Casadei and Paolo Tassotti, IEEE Euromicro PDP, 5 pages.
(Continued)

*Primary Examiner* — Alina A Boutah
(74) *Attorney, Agent, or Firm* — Cooper Legal Group, LLC

(57) ABSTRACT

In storage networks (e.g., SAN and NAS), various reasons can arise for migrating an application layer communication session endpoint to a different host. To achieve scalability and robustness, the migration can be enacted externally and carried out at a middlebox at the transport layer. When a migration is triggered to migrate an application layer communication session endpoint from a host A to a host B, the middlebox coordinates network address translation with a transport protocol reset mechanism to switch the connection to host B and close the connection on host A with minimal disruption to the non-migrating application layer communication session endpoint using the connection. At the application layer, the non-migrating application layer communication session endpoint will initiate a new connection in response to detecting the reset, and retry any operation that was aborted as a result of the connection switch.

20 Claims, 8 Drawing Sheets

(58) Field of Classification Search
CPC . H04W 92/12; H04W 36/0011; H04W 80/06; H04L 29/08729; H04L 29/12924; H04L 43/0811; H04L 61/2521; H04L 61/6063; H04L 65/605; H04L 67/1008; H04L 67/1036; H04L 67/1097; H04L 67/147; H04L 67/28; H04L 69/161
See application file for complete search history.

(56) References Cited

U.S. PATENT DOCUMENTS

| | | | | |
|---|---|---|---|---|
| 8,195,835 | B2* | 6/2012 | Ansari | H04W 36/0011 709/225 |
| 8,224,885 | B1* | 7/2012 | Doucette | G06F 9/5044 709/201 |
| 8,595,343 | B2* | 11/2013 | Cherian | G06F 13/4004 370/351 |
| 8,644,823 | B2* | 2/2014 | Rozinov | H04L 61/1535 370/328 |
| 2003/0054798 | A1* | 3/2003 | Kobayashi | H04L 63/0227 455/411 |
| 2003/0123481 | A1* | 7/2003 | Neale | H04B 7/18582 370/466 |
| 2005/0198384 | A1* | 9/2005 | Ansari | H04W 36/0011 709/245 |
| 2007/0033645 | A1* | 2/2007 | Jones | H04L 29/12009 726/12 |
| 2007/0091902 | A1* | 4/2007 | Stewart | H04L 29/12462 370/401 |
| 2009/0157866 | A1* | 6/2009 | Sridharan | H04L 69/16 709/224 |
| 2010/0312902 | A1* | 12/2010 | Chaturvedi | H04M 7/0063 709/228 |
| 2011/0213893 | A1* | 9/2011 | Morris | H04L 69/22 709/232 |
| 2011/0270908 | A1* | 11/2011 | Kern | H04L 45/24 709/203 |
| 2012/0079056 | A1* | 3/2012 | Turanyi | H04L 29/06 709/213 |
| 2012/0158976 | A1* | 6/2012 | Van der Merwe | H04L 45/02 709/228 |
| 2013/0031256 | A1* | 1/2013 | Hampel | H04L 69/16 709/227 |
| 2013/0086142 | A1* | 4/2013 | Hampel | H04L 67/148 709/203 |
| 2013/0097658 | A1* | 4/2013 | Cooper | H04L 63/0209 726/1 |
| 2013/0111038 | A1* | 5/2013 | Girard | H04L 45/245 709/226 |
| 2013/0191434 | A1* | 7/2013 | Smith | G06F 9/542 709/201 |
| 2015/0012665 | A1* | 1/2015 | Kang | G06F 9/45558 709/245 |

OTHER PUBLICATIONS

"Open Flow: Enabling Innovation in Campus Networks," Mar. 14, 2008, Nick McKeown, Tom Anderson, Hari Balakrishnan, Guru Paruikar, Larry Peterson, Jennifer Rexford, Scott Shenker and Jonathan Turner, reprinted from the Internet at: http://archive.openflow.org/documents/openflow-wp-latest.pdf, 6 pages.

Pfaff B., et al., "Open Flow Switch Specification," Version 1.0.0 (Wire Protocol 0x01), 2009, 42 pages.

Software-Defined Networking: The New Norm for Networks, Open Networking Foundation, Apr. 13, 2012, 12 pages.

"Migratory TCP: Connection Migration for Service Continuity in the Internet", Florin Sultan, Kiran Srinivasan, Deepa Iyer and Livin Iftode, Proceedings of the 22nd International Conference on Distributed Computing Systems (ICDCS'02), 2002, 2 pages.

Notice of Allowance cited in U.S. Appl. No. 14/204,117 dated Mar. 2, 2016, 11 pgs.

* cited by examiner

US 10,291,723 B2

EXTERNALLY INITIATED APPLICATION SESSION ENDPOINT MIGRATION

RELATED APPLICATIONS

This application claims priority to and is a continuation of U.S. application Ser. No. 14/204,117, filed on Mar. 11, 2014, now allowed, titled "EXTERNALLY INITIATED APPLICATION SESSION ENDPOINT MIGRATION," which claims priority to Indian Application No. 268/MUM/2014, filed on Jan. 24, 2014, currently titled "EXTERNALLY INITIATED APPLICATION SESSION ENDPOINT MIGRATION," both which are incorporated herein by reference.

BACKGROUND

Embodiments of the inventive subject matter generally relate to the field of computer networking, and, more particularly, to migrating an endpoint of an application session.

The Open Systems Interconnection (OSI) model is a conceptual model that logically partitions inter-system communication functionality into layers. The higher layers correspond to user level or near user level applications that uses the services provided by protocols of the lower layers. The applications access the lower layer services by calling Application Programming Interface (API) functions defined for an implementation of a lower layer protocol. For instance, an application running in a particular operating system will bind to an address and port, create a connection, communicate over the connection, and close the connection using functions of a sockets API provided by the operating system. Each of the socket API functions invokes program code that operates in accordance with the lower layer protocol, such as the transmission control protocol.

The transmission control protocol (TCP) is a connection-oriented transport layer protocol that provides reliable byte-stream delivery between two network hosts. The transmission control protocol (TCP) is coupled with the Internet Protocol (IP) and numerous other protocols as a suite of networking protocols. This suite of protocols is often referred to as a TCP/IP protocol suite. TCP/IP employs an abstraction of 4 layers similar to some of the layers in the Open Systems Interconnect (OSI) 7 layer reference model. Layer 4 of TCP/IP corresponds to layers 5-7 of the OSI reference mode. Although a TCP/IP protocol suite may include a network interface protocol (e.g., PPP or SLIP), the network interface layer (or data link layer) typically is not implemented by a TCP/IP stack (i.e., code implementing the TCP/IP protocol) because the TCP/IP stack relies upon another protocol (e.g., Ethernet). While the IP governs network protocol issues (e.g., addressing, routing, and datagram packaging), the TCP governs transport protocol issues. These issues include establishing, managing, and terminating connections; reliability; quality of service; flow control and congestion avoidance; and addressing/multiplexing.

In TCP, a connection is established between hosts with a 3-way handshake. The 3-way handshake involves an exchange of 3 messages between hosts. The TCP messages have the same structure, but will have either a SYN flag set, an ACK flag set, or both flags set. The flag defines the message. To initiate the 3-way handshake, a first host sends a synchronization message (SYN) to the second host. The SYN includes a sequence number field. The sequence number field indicates an initial sequence number (ISN=X) when set in a SYN message. The second host responds to the SYN with a SYN+ACK message (i.e., both the SYN flag and the ACK flag are set). This SYN+ACK message builds upon the SYN message and establishes the sequencing used for other features and functionality of TCP (e.g., reliability). The sequence number field of the SYN+ACK will have an ISN (Y) for the second host, while an acknowledgement number field of the SYN+ACK will have a number that is the sequence number expected by the second host to be received from the next message from the first host (X+1). This acknowledgement number is the sequence number from the SYN message incremented by one. In response to the SYN+ACK, the first host will respond with an ACK. This ACK from the first host may already carry data, whereas the previous messages did not. In addition, the ACK from the first host has a sequence number X+1 and an acknowledgement number Y+1. The connection is established after this ACK has been sent from the first host to the second host. A connection is identified with the addresses and ports of both hosts.

TCP also provides for a handshake exchange to close an established connection. Each side of a connection terminates independently. A first host sends a message with the FIN flag set to a second host of a connection. The second host acknowledges the FIN message with an ACK message. At this point, the connection is half-closed. When ready, the second host will send a FIN message to the first host. The first host then responds with an ACK. After the second host receives and processes the ACK from the first host in response to the second host's FIN message, the connection between the first and second hosts has been closed. This FIN handshake closes a connection in an ordered manner. TCP also provides a connection reset mechanism and defines a reset flag in the structure of a TCP message. A host will utilize the reset mechanism when an error is detected (e.g., receipt of a data message for a connection that is not open; receipt of a SYN+ACK for which a SYN was not sent). When a host receives RST, the host will abort the connection identified by the RST, possibly after checking the validity of the RST.

BRIEF DESCRIPTION OF THE DRAWINGS

The embodiments may be better understood, and numerous objects, features, and advantages made apparent to those skilled in the art by referencing the accompanying drawings.

DETAILED DESCRIPTION

The description that follows includes example systems, methods, techniques, instruction sequences and computer program products that embody techniques of the inventive subject matter. However, it is understood that the described embodiments may be practiced without these specific details. For instance, although examples refer to TCP, embodiments are not so limited. The inventive subject matter can be employed in embodiments that use other transport protocols that provide a reset mechanism. In other instances, well-known instruction instances, protocols, structures and techniques have not been shown in detail in order not to obfuscate the description.

In storage networks (e.g., SAN and NAS), various reasons can arise for migrating an endpoint of an application layer communication session to a different host (e.g., file server, storage controller, tape drive controller, etc.). As examples, a session endpoint associated with host A may be migrated to host B for load balancing, to perform maintenance on host A, to migrate to hosts newly added to a cluster, in a failover scenario, etc. To achieve scalability and robustness, the migration can be enacted from an external device and carried out by a middlebox at the transport layer. This migration allows an application layer session to persist through a change of an endpoint of the underlying connection. When a migration is triggered to migrate an application session endpoint from a host A to a host B, the middlebox coordinates network address translation with a transport protocol reset mechanism to switch the connection to host B and close the connection on host A with minimal disruption to the non-migrating application session endpoint using the connection. At the application layer, the non-migrating application session endpoint (e.g., an application process) will initiate a new connection in response to detecting the reset, and retry any operation that was aborted as a result of the connection switch.

Figure 1:
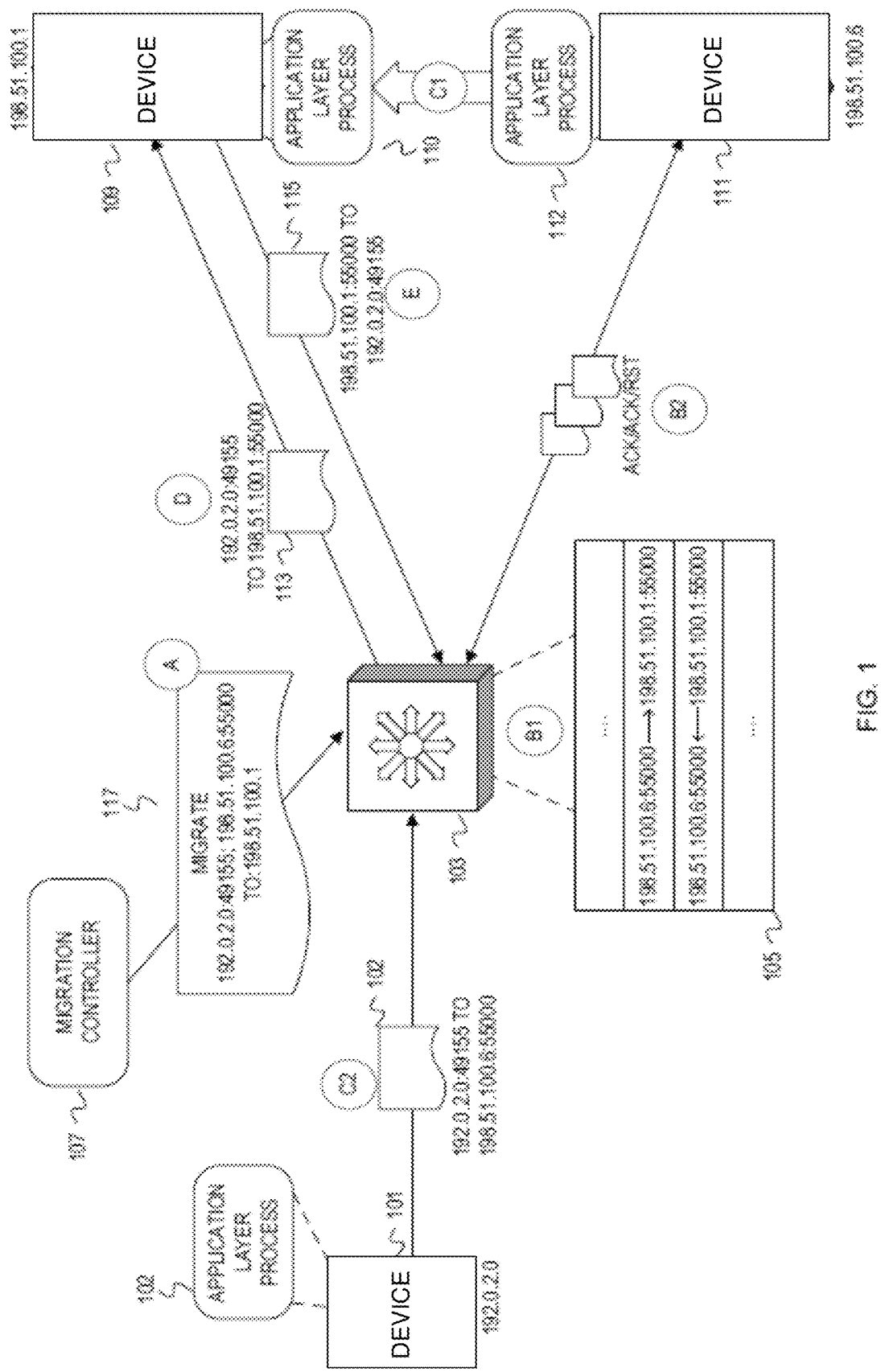
FIG. 1 depicts a conceptual diagram of an example migration of an application session endpoint.

FIG. 1 depicts a conceptual diagram of an example migration of an application session endpoint. FIG. 1 depicts a network appliance or middlebox 103. The middlebox 103 is communicatively coupled with a host 101 ("client"), a host 111 ("server"), and a host 109 ("server"). FIG. 1 also depicts a migration controller 107. FIG. 1 depicts this example migration with a sequence of labels A-F. The sequence of labels approximates the order of operations corresponding to the labels. The labels include B1 and B2 and C1 and C2. The operations corresponding to these labels can occur in various orders, including overlapping. The application session endpoint is being migrated from server 111 to server 109. "Migrating" an application session endpoint between hosts can refer to instantiating an application layer process on the host that is the target of the migration ("to_host"). In some cases, an instance of the application layer process is already running on the to_host. If the application layer process is stateful, then a migration controller can instruct the application layer process at the host from which the application layer process is being migrated ("from_host") to communicate state information to the to_host. The to_host can either instantiate an application layer process with this state information or change state of an already instantiated application layer process in accordance with the communicated state information. An application layer process 112 at server 111 is in communication with an application layer process 102 at client 101. The client has a network address of 192.0.2.0. The server 111 has a network address 198.51.100.6. The connection is identified as "192.0.2.0:49155; 198.51.100.6:55000."

At A, the migration controller 107 communicates a request 117 to migrate an application session endpoint of the connection "192.0.2.0:49155; 198.51.100.6:55000" from server 111 to server 109. The server 109 has a network address 198.51.100.1. The request 117 indicates the addresses and ports of the hosts corresponding to the connection that supports the application session endpoint being migrated. For this example, the request 117 indicates the address and port for client 102 (192.0.2.0:49155), and the address and port for server 111 (198.51.100.6:55000). The request 117 specifies both hosts addresses and ports, since multiple connections can exist concurrently between hosts. The request 117 also indicates the server 109 as the TO address (i.e., the address to which the application session endpoint is being migrated).

After receiving the request 117, the middlebox 103 commences B1 and B2. At B1, the middlebox 103 configures network address translation rules for both directions of the connection. The middlebox 103 configures the network address translation rules to change 198.51.100.6:55000 to 198.51.100.1:55000 when server 111 is a destination for data of the connection, and change 198.51.100.1:55000 to 198.51.100.6:55000 when server 109 is a source for data of the connection. Although this illustration uses the same port numbers between the hosts, embodiments are not limited to translating with the same port numbers. In some cases, an application session endpoint may be allowed a range of port numbers. Thus, the address translation can use different port numbers that are valid for the corresponding application session endpoint. The middlebox 103 installs the network address translation rules in a connection table 105. The connection table 105 indicates the connections that traverse the middlebox 103. At B2, the middlebox 103 leverages a reset mechanism of TCP to close the connection at the server 111. The middlebox 103 creates an ACK as if from the client 101, and sends it to the server 111 to solicit an ACK from the server 111. The middlebox 103 then sends a RST, as if from the client 101, to the server 111 with an appropriate sequence number derived from the ACK from the server 111. The server 111 closes the connection after receiving the RST from the middlebox 103.

After these operations, data traffic associated with the connection "192.0.2.0:49155; 198.51.100.6:55000" (i.e., data traffic to and from the application layer process 102 in this illustration) actually traverses a de facto connection between the client 101 and the server 109 with the address translations. At C1, the application layer process 112 migrates from the server 111 to the server 109. As discussed earlier, this migration may involve instantiating the application layer process 110. Or the application layer process 110 may already be running at the server 109. If the application layer protocol of the application layer processes is stateful, then the migration controller 107 can direct the application layer process 112 to communicate state information to the server 109. If the application layer process 110 is to be instantiated, the migration controller 107 can direct the server 109 to instantiate the application layer process 109. Although depicted as C1, the migration controller 107 can direct any exchange of state information or instantiation of a process at a different time that precedes eventual receipt of data at the server 109. At C2, the client 101 transmits a data message 102. The data message 102 indicates the connection "192.0.2.0:49155; 198.51.100.6:55000." At D, the middlebox 103 transmits a message 113 to the server 109 after the configured address translation rules have been applied to the message 102. The message 113 indicates a connection "192.0.2.0:49155; 198.51.100.1:55000." At E, the server 109 responds to the message 113 with a message 115. The message 115 indicates the connection "198.51.100.1:55000; 192.0.2.0:49155." After the middlebox 103 applies the network address translation rules installed in the connection table 105 to the message 115, the middlebox will send a corresponding message that indicates the connection "192.0.2.0:49155; 198.51.100.6:55000" to the client 101.

The illustration of FIG. 1 is meant to introduce the inventive subject matter and should not be used to limit scope of the claims or embodiments. For instance, a host may be a "client" in one context and a "server" in another context. In addition, a host can function as both a client and a server. This illustration refers to_host 101 as a client, host 111 as a server, and host 109 as a server in an effort to simplify the illustration. The migration controller 107 may be a separate network device (e.g., an OpenFlow controller). The migration controller 107 may be software executing on the middlebox 103, hardware of the middlebox 103, or a combination of hardware and software on the middlebox 103. Implementations may use an OpenFlow flow table, and install the network address translation rules into the flow table. For instance, the migration controller 107 may send the network address translation rule to the middlebox 103 and identify connections (e.g., 192.0.2.0:49155; 198.51.100.6:55000) affected by a migration. The middlebox 103 then installs the rule into the flow table entries corresponding to the connections. In some implementations, the middlebox modifies the flow corresponding to one direction of a connection being migrated and adds a flow for the reverse direction of the connection.

Figure 2:
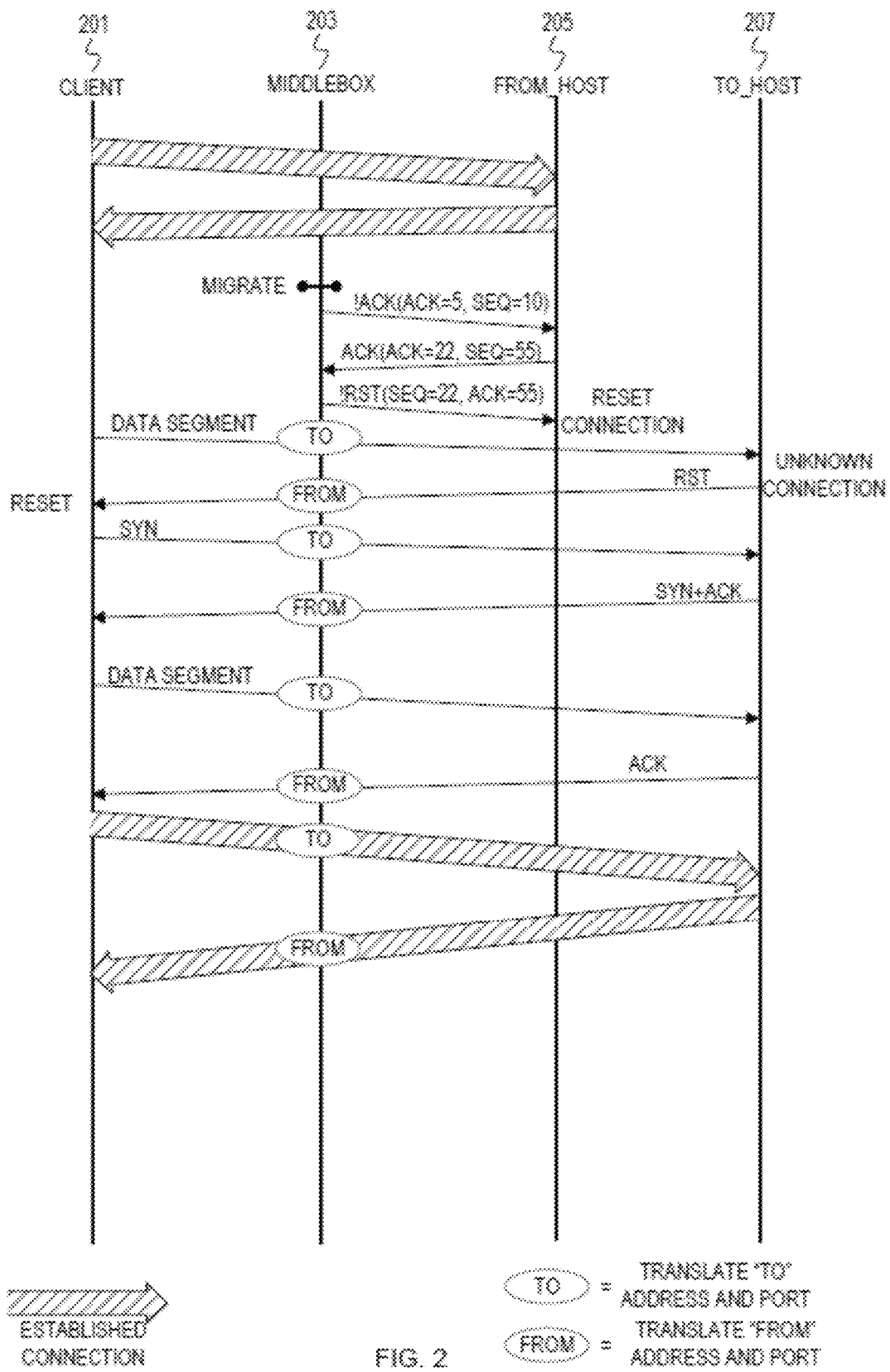
FIG. 2 depicts a sequence diagram of interactions for an example externally initiated application session endpoint migration.

FIG. 2 depicts a sequence diagram of interactions for an example application session endpoint migration. The sequence diagram depicts interactions among a client 201, a middlebox 203, a from_host 205, and a to_host 207. The application layer process corresponding to this sequence diagram is initially being migrated from the from_host 205 to the to_host 207. Block arrows with hash marks depict communications over an established connection between the client 201 and the from_host 205. At some point, a migration is triggered, which results in network address translation rules being installed or configured in the middlebox 203. The middlebox 203 sends an ACK with an ACK number 5 and a sequence number (SEQ) 10. Both of these numbers are randomly selected or generated. The from_host 205 should not expect the SEQ 10 based on previous messages from the client 201. If the SEQ sent by the middlebox 203 is expected by the from_host 205, then the to_host 207 may not respond. In addition, the to_host 207 may not respond if the segments are lost (e.g., due to congestion). To account for the possibility of a host not responding to a spoofed message, the middlebox 203 uses a timer to trigger another spoofed message if a response to the spoofed ACK is not received within a predefined time period. In that case, the middlebox 203 can select/generate a different number that goes beyond the possible window of expected SEQs. For example, the middlebox can compute a number that exceeds the receive window based on a protocol defined size of the receive window. The ACK is depicted as !ACK in FIG. 2 because it is a spoofed ACK. The middlebox 103 creates the ACK with data that identifies the source as the client 201 even though the ACK is created at the middlebox 203. In response to the spoofed ACK, the from_host 205 sends an ACK with an appropriate ACK number (22) and SEQ number (55) based on the established connection with the client 201. The middlebox 203 intercepts this ACK from the from_host 205, thus preventing transmission of the ACK to the intended destination, client 201. The middlebox 203 spoofs a reset message, depicted as !RST in FIG. 2, with the sequence number as 22 and the ACK number as 55. Since the spoofed reset message has the appropriate sequence number as expected by the from_host 205 from the client 201, the from_host 205 resets the connection accordingly.

The application layer process and TCP layer at the client 201 are unaware that the connection with the from_host 205 has been reset by the from_host 205. The TCP layer at the client 201 proceeds to send a next segment with data (depicted as DATA SEGMENT in FIG. 2) based on the previous exchanges with the from_host 205 and/or based on a current request of the supported application layer process. When the client 201 sends the next segment, the middlebox 203 modifies the segment in accordance with the network address translation rules. The middlebox 203 modifies the IP header to change the destination from the network address of the from_host 205 to the network address of the to_host 207. In addition, the middlebox 203 modifies the TCP header to change the destination port, unless the same destination port is being used by the to_host 207 as was used for the connection between the client 201 and the from_host 205. Accordingly, the segment is sent to the to_host 207 by the middlebox 203 instead of being sent to the from_host 205. The to_host 207 does not recognize the connection identified by the received segment since a connection has not been established between the client 201 and the to_host 207. Therefore, the to_host 207 sends the client 201 a RST with the sequence number corresponding to the received segment (i.e., using the ACK number of the received segment). However, the middlebox 203 applies the network address translation rules to the RST. The middlebox 203 changes the network address indicated in the RST from the network address for the to_host 207 to the network address for the from_host 205. In addition, the middlebox changes the destination port of the RST to indicate the port of the connection between the client 201 and the from_host 205, unless the port number is the same. The client 201 validates the sequence number of the RST and performs operations for resetting the connection. The application layer process that was using the connection detects the reset. Accordingly, the application layer process will invoke the functions of the transport layer to open a new connection for the application layer process. In some cases, the reset may interrupt an operation being performed by the application layer process. In those cases, the application layer process may attempt to retry the interrupted operation. Retrying the interrupted operation or continuing with operations involves re-establishing a connection. The application layer process causes the client 201 to send a SYN that initiates a 3-way handshake between the client 201 and, from the perspective of the client 201, the from_host 205. However, this 3-way handshake will actually be between the client 201 and the to_host 207 because of the address translation rules being applied at the middlebox 203. The client 201 may or may not use the same source port for reconnection. All of these segments traverse the middlebox 203, which applies the address translation rules to any segments that identify the connection between the client 201 and the from_host 205. Thus, the client 201 perceives the connection as between the client 201 and the from_host 205, while the to_host 207 perceives the connection as between the client 201 and the to_host 207.

Figure 3:
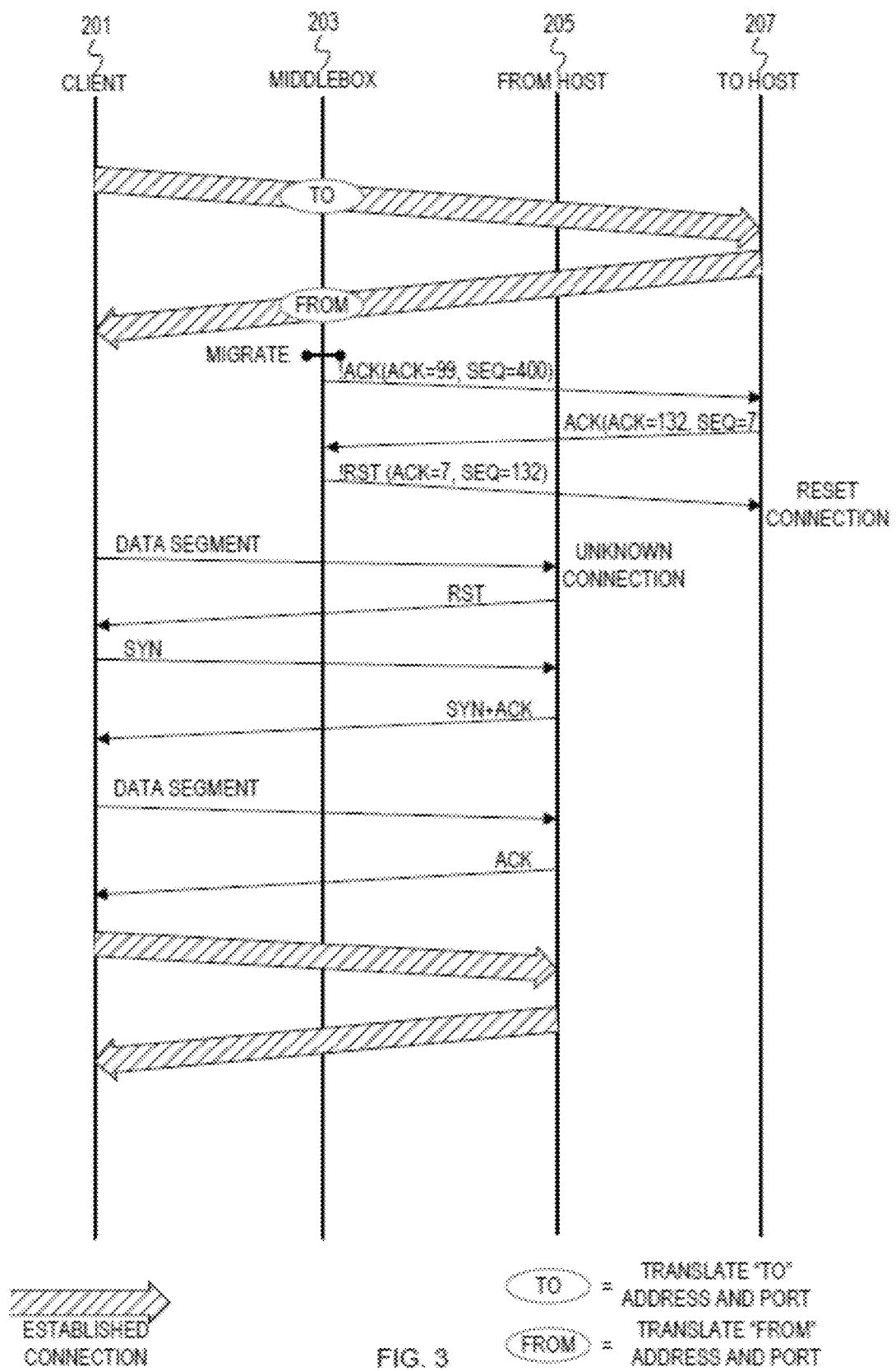
FIG. 3 depicts a sequence diagram of an example externally initiated application session endpoint migration back to the from_host of FIG. 2.

Although some migrations endure (e.g., due to failover), other migrations are temporary. In the cases of load balancing or maintenance, for example, the application session endpoint may be migrated to yet another host, which may include migration back to the original host. If the connection had not been closed on the original host, then a connection with the same network addresses and ports may not be established without disrupting the application layer process (e.g., a network file system application process) that relies on the connection. FIG. 3 depicts a sequence diagram of an example middlebox based migration back to the from_host of FIG. 2. Block arrows with hash marks depict communications over the established connection between the client 201 and the to_host 207. The TO address translation rules are applied to communications that indicate the connection previously between the client 201 and the from_host 205 as identified by address and port pairs. At some point, a migration is triggered, which results in the network address translation rules being removed or deactivated. The middlebox 203 sends an ACK with an ACK number 99 and a SEQ 400. The middlebox 203 randomly selects or generates these numbers. If these numbers are expected by the to_host 207, then the to_host 207 may not respond. In addition, the to_host 207 may not respond if the segments are lost (e.g., due to congestion). To account for the possibility of a host not responding to a spoofed message, the middlebox 203 uses a timer to trigger another spoofed message if a response to the spoofed ACK is not received within a predefined time period. In that case, the middlebox 203 at least generates a different ACK number, if not both numbers. This spoofed ACK is also depicted in FIG. 3 as !ACK because it is a spoofed ACK. The middlebox 103 creates the spoofed ACK by writing the source port as the port of the client 201 that partly identifies the affected connection and the address of the source as the address of the client 201. In response to the spoofed ACK, the to_host 207 sends an ACK with an appropriate ACK number and SEQ, in this example 132 and 7, based on previous exchanges with the client 201. The middlebox 203 intercepts this ACK from the to_host 207. The middlebox 203 spoofs a reset message, depicted as !RST in FIG. 3, with the sequence number as 132 and ACK as 8. Since the spoofed reset message has the appropriate sequence number as expected by the to_host 207 from the client 201, the to_host 207 resets the connection.

Similar to the first migration, the application layer process and the TCP stack at the client 201 are unaware of the connection reset by the to_host 207. When the client 201 sends the next segment, address translation rules are not applied to the segment at the middlebox 203 because the address translation rules have been deactivated or removed. Since the address translation rules are not applied to the segment, the segment is delivered to the indicated recipient, which is the from_host 205. But the from_host 205 does not recognize the connection indicated by the segment since the from_host 205 previously reset the connection with the client 201, which resulted in the connection being closed from the perspective of the from_host 205. Therefore, the from_host 205 sends the client 201 a RST that has a proper SEQ based on the received segment. The client 201 validates the sequence number of the RST and performs operations to reset the connection. At this point, the application layer process will re-try an operation that was interrupted by the connection reset (if any), and will attempt to re-establish the connection identified with the same destination port and address pair as previously used. The client 201 may or may not use the same source port for reconnection. The client 201 sends a SYN that initiates a 3-way handshake between the client 201 and the from_host 205.

Figure 4:
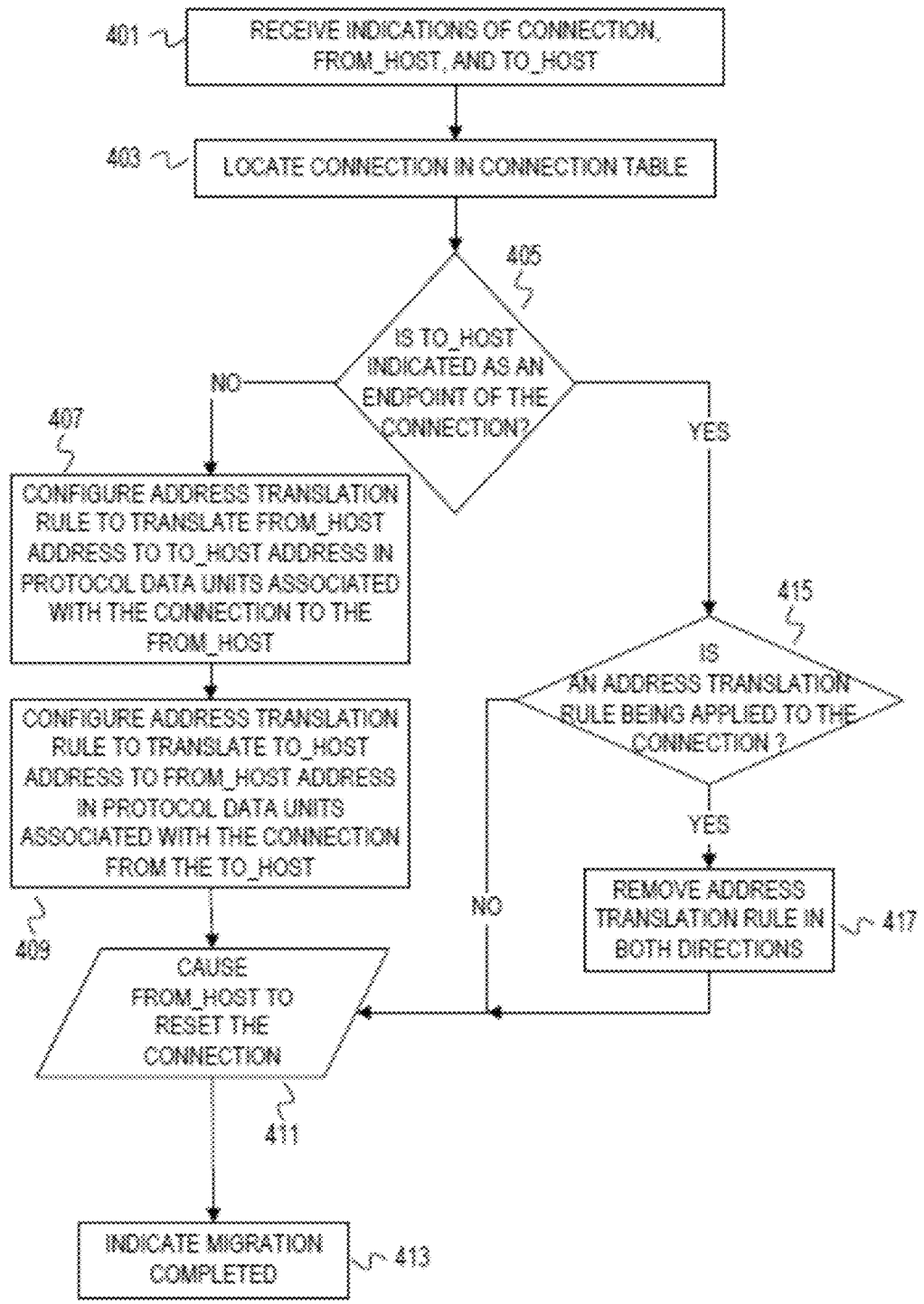
FIG. 4 depicts a flowchart of example operations for externally initiated application session endpoint migration.

FIG. 4 depicts a flowchart of example operations for application session endpoint migration. At block 401, a middlebox receives indications of a connection, a from_host, and a to_host. The indication of the connection may be a source network address, a source port, a destination address, and a destination port. The indication of the connection can include port identifiers and additional network addresses (e.g., media access control (MAC) layer addresses). In some cases, the indication of the connection may be an identifier of a flow or connection other than a TCP connection (e.g., a virtual local area network (VLAN) tag, a virtual circuit identifier (VCI), etc.). A middlebox may receive the indications in a command or message from a controller that is separate from the middlebox. The command or message indicating migration may be responsive to an administrator action (e.g., explicit command to migrate) or to an event that automatically triggers the migration (e.g., failover event).

At block 403, the middlebox locates the connection in a connection table. For example, a connections table or a flow table is searched for an entry that matches the IP addresses and port numbers that identify the connection. In some cases, MAC addresses and other information may also be matched.

At block 405, the middlebox determines whether the to_host is indicated as an endpoint of the connection. In other words, the middlebox determines whether migration is being requested back to the original endpoint of the connection. If the to_host is indicated as the endpoint of the connection, then control flows to block 415. Otherwise, control flows to block 407.

At block 407, the middlebox configures an address translation rule to translate the from_host address to the to_host address in protocol data units associated with the connection and flowing to the from_host. If the to_host is not employing the same port identifier as the from_host, then the translation rule will also translate the destination port of protocol data units associated with the connection to a different port identifier that will or is used by the to_host. In some cases, the translation rule will also modify the source port or other information in communications. The middlebox can determine whether a different connection is already established with the to_host using the same source port. In that case, the address translation rule can be created to change the source port.

At block 409, the middlebox configures an address translation rule to translate the to_host address to the from_host address in protocol data units associated with the connection and flowing from the to_host (i.e., address translation rules that reverse the translations of the translation rule set in block 407). Embodiments can configure the network address translation rules in various manners. The middlebox may invoke a network address translation program and pass the indications of the from_host and the to_host and relevant port identifiers as parameters to the network address translation program with an indication of the different translations for the different directions of data associated with the connection. The middlebox may write the different network address translation rules into corresponding flow table entries (i.e., write the first network address translation rule into the flow table entry that corresponds to flow from a client to the to_host and the second network address translation rule into the flow table entry that corresponds to flow from the to_host to the client). The network address translation rules may have been sent to the middlebox. In that case, the middlebox copies the network address translation rules into the corresponding flow table entries.

At block 411, the middlebox causes the from_host to reset the connection (i.e., perform operations that implement reset as defined by the corresponding transport layer protocol).

At block 413, the middlebox indicates that the migration has completed. For example, the middlebox can set a flag in flow table entries corresponding to the migrated connection endpoint. As another example, the middlebox can supply a notification to a controller.

If the to_host was an initial endpoint of the connection, then control flows to block 415. At block 415, the middlebox determines whether an address translation rule is being applied to the connection. For instance, the middlebox finds a flow table entry that matches the connection and determines whether a network address translation rule is written into the entry or referenced in the entry. If not, then control flows to block 411. If a network address translation rule is being applied to the connection, then the middlebox removes the network address translation rule in both directions of the connection at block 417. Removing the network address translation rules can vary among implementations. The middlebox may delete the rules or mark the rules for deletion from the entries in which they are installed. The middlebox can set a flag associated with the network address translation rules to indicate that the rules are not to be applied. Control flows from block 417 to block 411.

Figure 5:
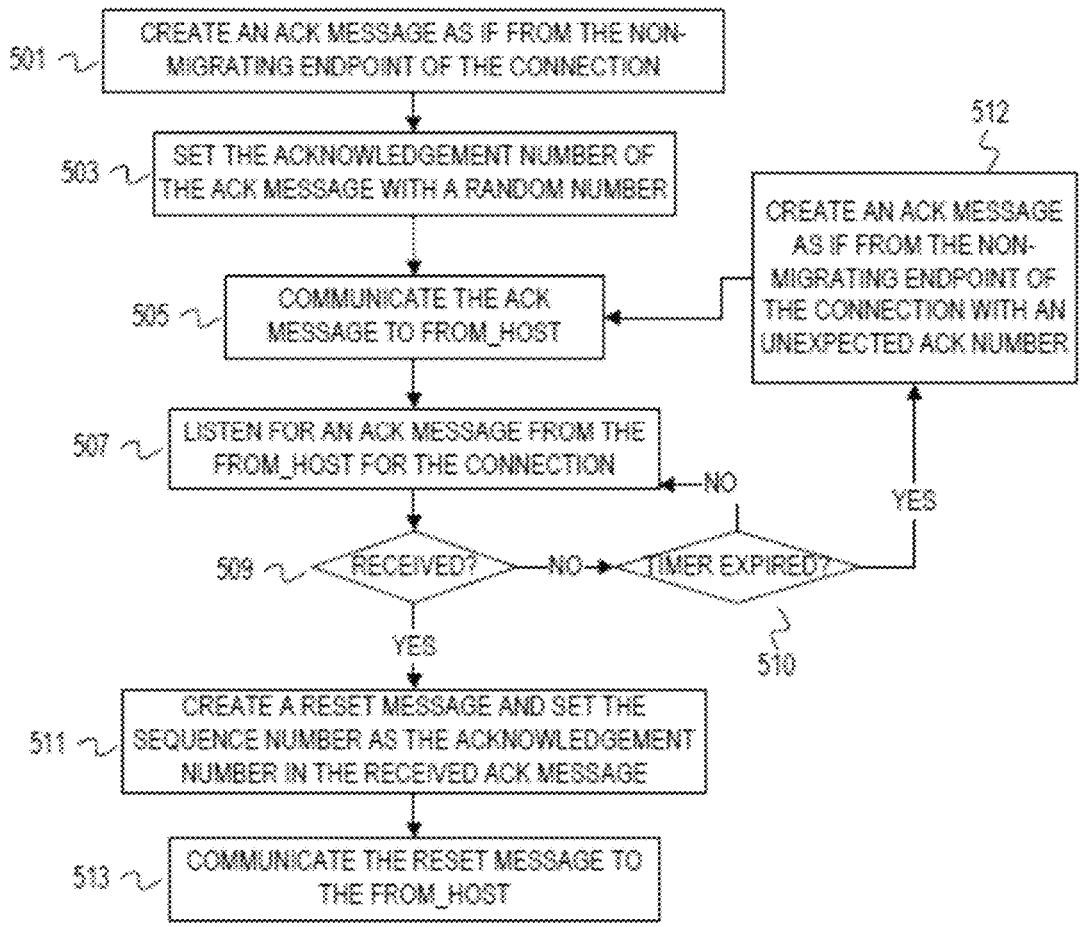
FIG. 5 depicts a flowchart of example operations for a middlebox to cause a host to reset a connection for externally initiated application session endpoint migration.

FIG. 5 depicts a flowchart of example operations for a middlebox to cause a host to reset a connection for application session endpoint migration. FIG. 5 corresponds to box 411 of FIG. 4. At block 501, the middlebox creates an ACK message as if from the non-migrating endpoint of the connection. With the connection information (e.g., IP addresses and ports), the middlebox constructs a message that indicates a source IP address and source port with the information about the non-migrating endpoint host of the connection. The middlebox sets the destination IP address and destination port with the connection information about the migrating endpoint host (i.e., from_host). The middlebox also sets the ACK flag in the message.

At block 503, the middlebox sets the acknowledgement number of the constructed ACK message with a random number. The middlebox generates a random number, perhaps with a pseudo-random number generator module. The middlebox may randomly select a number from the range of possible acknowledgement numbers.

At block 505, the ACK message is communicated to the from_host. The middlebox transmits the ACK over the network to the from_host.

At block 507, the middlebox listens for an ACK message from the from_host for the connection. For instance, a TCP stack executing on the middlebox waits for the ACK from the from_host. As another example, the middlebox can have a process that is not a TCP stack but monitors a receive buffer for the ACK message. The middlebox periodically determines whether an ACK message has been received from the from_host at block 509. If a response is received, then the random number selected for the ACK number was out-of-window and control flows to block 511. If no response is received before a configurable time period expires at block 510, the random number chosen in block 503 happened to lie inside the receive window of the connection. As mentioned earlier, a response may also not be received because either of the ACK message or a response to the ACK message is lost in the network. In case of no response, control flows to block 512 where the middlebox creates another ACK message as if from the non-migrating host of the connection. This ACK is created with a different random number for the ACK number. For example, the middlebox increases the randomly chosen ACK number by the maximum window size (e.g., 2^30+1), which means the new ACK number is guaranteed to lie outside the window. Control then returns to block 505, where the new ACK is sent.

At block 511, the middlebox creates a reset message and sets the sequence number of the RST message as the acknowledgement number specified by the from_host. The middlebox constructs the RST message with this number to ensure the from_host can validate the RST message, and will not ignore the RST message. As with the ACK message, the middlebox constructs the RST message as if the non-migrating connection host is the source of the RST message.

At block 513, the middlebox communicates the RST message to the from_host.

Although FIG. 4 presumes that a migration trigger will indicate a connection for migration, embodiments can request migration of multiple connections either by specifying multiple connections or indicating criteria for migrating connections. In some cases, a load balancing event may lead to a sequence of migration requests for several of the connections on a server to different new servers. The migration requests can indicate an application or port that corresponds to the application to guide selection of connections for migration and a total number of connections to migrate.

Embodiments may proactively initiate the reset and handshake between a client and a to_host. As can be seen in FIG. 2, the to_host does not send a RST until a segment is received from the client. This segment, for example, may correspond to a new network file system (NFS) operation request or a pending NFS operation that was previously requested by the client. In some cases, the client TCP stack may be silent. The client TCP stack may be waiting for either the TCP receive window or transmit window to be freed up—both triggered by an update (ACK) from the server. Since no updates are coming from the server after a migration, the session enters into a deadlock. The deadlock is broken with a timeout mechanism either external to TCP (e.g., the NFS retry timeout (by default 60 seconds in GNU/Linux) is triggered), or TCP's timeout mechanism. Instead of waiting for a timeout mechanism, a middlebox can solicit the segment from the non-migrating connection host by sending a spoofed RST to the non-migrating connection host as well as to the migrating connection host.

Figure 6:
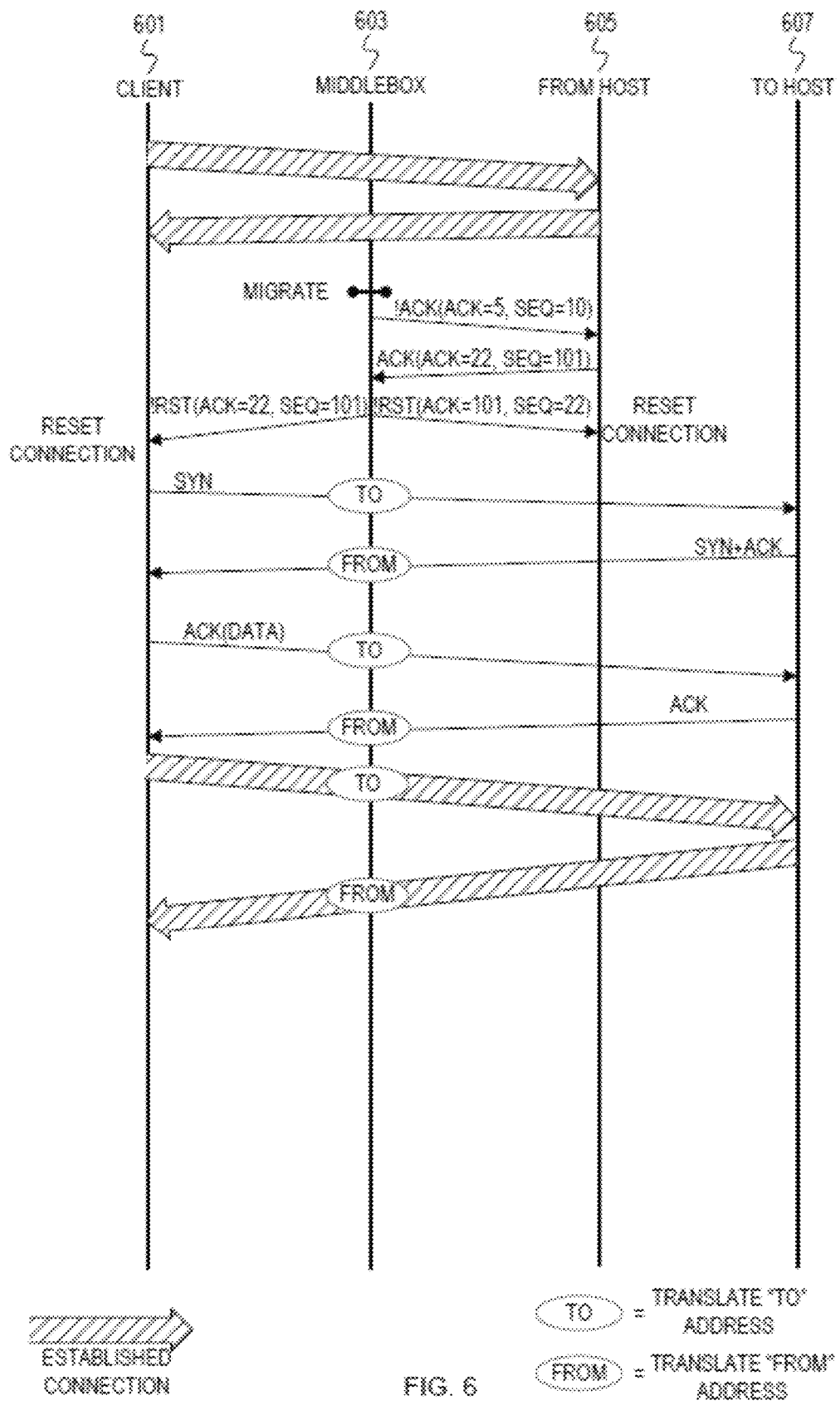
FIG. 6 depicts sequence diagram of example interactions for proactive establishment of a connection between a non-migrating connection endpoint and a to_host.

FIG. 6 depicts sequence diagram of example interactions for proactive establishment of a connection between a non-migrating connection host and a to_host. Many of the interactions will be similar to those depicted in FIG. 2, with the addition of the spoofed RST from a middlebox to a client. The sequence diagram of FIG. 6 depicts interactions among a client 601, a middlebox 603, a from_host 605, and a to_host 607. The application layer process in this sequence diagram is being migrated from the from_host 605 to the to_host 607. Block arrows with hash marks depict communications over an established connection between the client 601 and the from_host 605. At some point, a migration is triggered, which results in network address translation rules being installed or configured in the middlebox 603. The middlebox 603 sends an ACK with an ACK number 5 and a SEQ number 10. The ACK number is an ACK number that the from_host 605 does not expect based on previous messages from the client 601. The ACK is depicted as !ACK in FIG. 6 because it is a spoofed ACK. The middlebox 603 creates the ACK with data that identifies the source of the ACK as the client 601. In response to the spoofed ACK, the from_host 605 sends an ACK with a SEQ 101 and an appropriate ACK number, in this example 22, based on the established connection with the client 601. The middlebox 603 intercepts this ACK from the from_host 605 to prevent delivery to the client 601. The middlebox 603 spoofs a reset message, depicted as !RST in FIG. 6, with the sequence number as 22 and an ACK number 101. Since the spoofed reset message has the appropriate sequence number as expected by the from_host 605 from the client 601, the from_host 605 resets the connection accordingly. The ACK from the from_host 605 also indicated a sequence number, which is 101 in this example. The sequence number 101 from the from_host 605 is used for the spoofed RST that will be sent to the client 601. The middlebox creates the RST as if from the from_host 605 with the SEQ number 101 and ACK number 22. The middlebox then sends this spoofed RST to the client 601. The client 601 validates the sequence number 101 and resets the connection.

When the application layer process that was using the connection attempts a new operation or retries an operation that was interrupted by the connection reset, the client TCP stack will try to establish a new connection with the from_host 605 in response to the validated !RST (ACK=22, SEQ=101). Thus, the client 601 initiates a 3-way handshake with the from_host 605 with a SYN. With the configured network address translation rules at the middlebox 603, the 3-way handshake is actually with the to_host 607. All of these connection establishment messages traverse the middlebox 603, which applies the network address translation rules. Thus, a connection between the client 601 and the from_host 605 is indicated in the middlebox 603. But the connection actually carrying messages is between the client 601 and the to_host 607.

Figure 7:
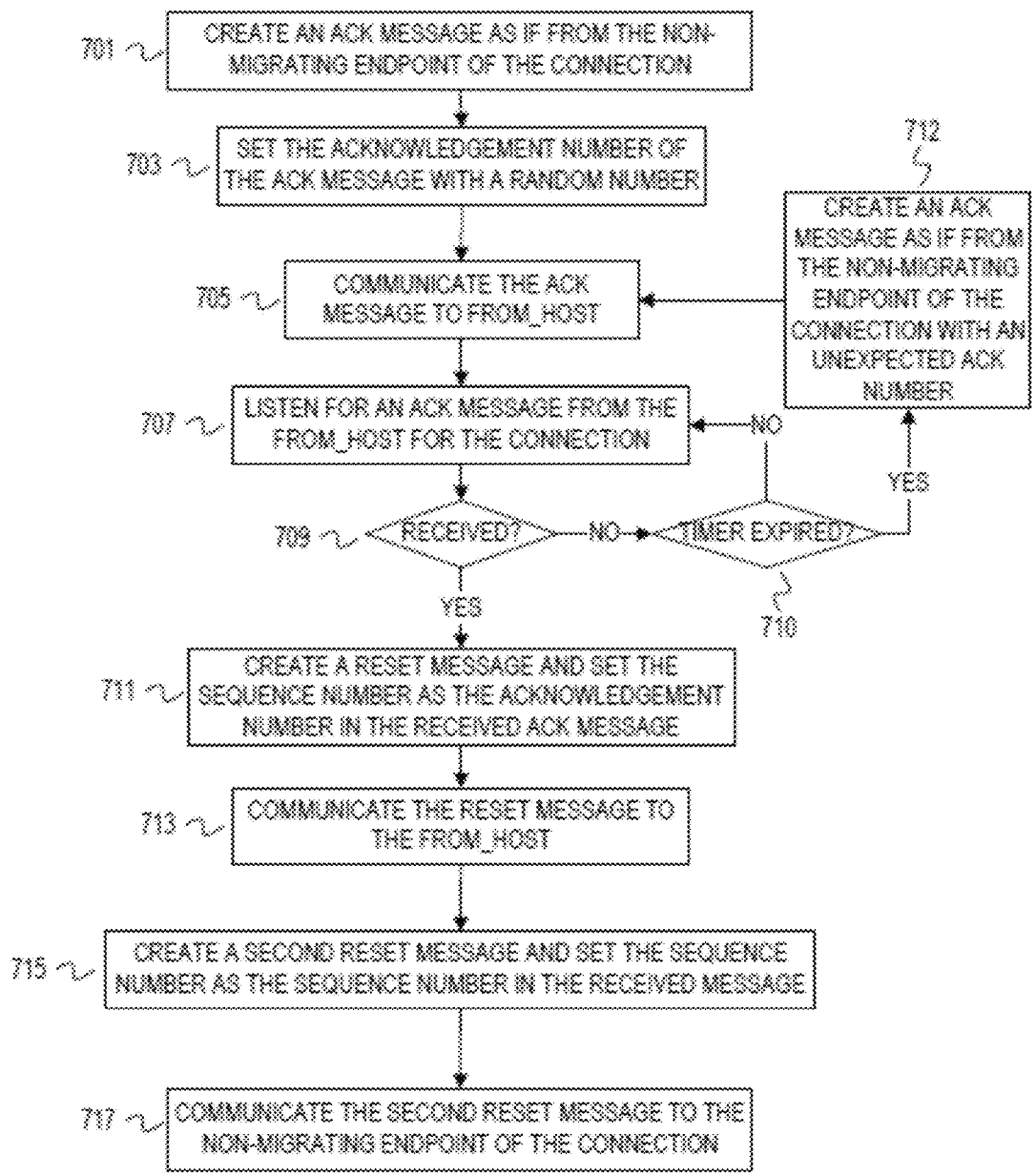
FIG. 7 depicts a flowchart of example operations for proactive establishment of a connection between a non-migrating connection host and a to_host in an externally initiated application session endpoint migration.

FIG. 7 depicts a flowchart of example operations for proactive establishment of a connection between a non-migrating connection host and a to_host in application session endpoint migration. The majority of operations of FIG. 7 are similar to those depicted in FIG. 5. Blocks 715 and 717 relate to the proactive solicitation of a SYN from a non-migrating connection host.

At block 701, the middlebox creates an ACK message as if from the non-migrating endpoint of the connection. With the connection information (e.g., IP addresses and ports), the middlebox constructs a message that indicates a source IP address and source port with the information about the non-migrating endpoint of the connection. The middlebox sets the destination IP address and destination port with the connection information about the migrating endpoint (i.e., from_host). The middlebox also sets the ACK flag in the message.

At block 703, the middlebox sets the acknowledgement number of the constructed ACK message with a random number. The middlebox may generate a random number, perhaps with a pseudo-random number generator module. The middlebox may randomly select a number from the range of possible acknowledgement numbers. Regardless of how the number is generated or selected, the middlebox attempts to select a number that is not expected by the from_host (e.g., a number outside of the sliding window of the from_host).

At block 705, the ACK message is communicated to the from_host. The middlebox transmits the ACK over the network to the from_host.

At block 707, the middlebox listens for an ACK message from the from_host for the connection. For instance, a TCP stack executing on the middlebox waits for the ACK from the from_host. As another example, the middlebox can have a process that is not a TCP stack but monitors a receive buffer for the ACK message. The middlebox periodically determines whether an ACK message has been received from the from_host at block 709. If a response is received, then the random number selected for the ACK number was out-of-window and control flows to block 711. If no response is received before a configurable time period expires at block 710, the random number chosen in block 703 happened to lie inside the receive window of the connection. Therefore, control flows to block 712 where the middlebox creates another ACK message as if from the non-migrating endpoint of the connection. This ACK is created with a different number for the ACK number. Some implementation can select or generate another random number and then manipulate that number to be outside of the receive window. In some implementations, the middlebox increases the randomly chosen ACK number by the maximum window size (e.g., 2^30+1), which means the new ACK number is guaranteed to lie outside the window. Control then returns to block 705, where the new ACK is sent.

At block 711, the middlebox creates a reset message and sets the SEQ number of the RST message as the acknowledgement number specified by the from_host. The middlebox constructs the RST message with this number to ensure the from_host can validate the RST message. As with the ACK message, the middlebox constructs the RST message as if the non-migrating connection host is the source of the RST message.

At block 713, the middlebox communicates the RST message to the from_host.

At block 715, the middlebox creates a second reset message and sets the SEQ number of the second RST message as the SEQ number specified by the from_host. The middlebox constructs the second RST message with this number to ensure the non-migrating connection endpoint can validate the second RST message. The middlebox constructs this RST message as if the from_host is the source of the second RST message.

At block 717, the middlebox communicates the second RST message to the non-migrating connection host.

Although reference is made to an NFS application/service, other session-based applications or services that use TCP as a transport and have idempotent operations with a retry mechanism can utilize the disclosed subject matter. For the NFS service, where client modifications are not feasible, this middlebox based connection migration supports session continuity and host selection. Furthermore, transport layer initiated middlebox based application layer process migration allows seamless capacity expansion with the addition of hosts, without the management overheads of configuring additional NFS mounts.

The flowcharts are provided to aid in understanding the illustrations and are not to be used to limit scope of the claims. The flowcharts depict example operations that can vary among embodiments and among implementations of embodiments. Additional operations may be performed; fewer operations may be performed; the operations may be performed in parallel; and the operations may be performed in a different order. For instance, a middlebox can employ an interrupt driven technique to determine when a from_host sends a response to a spoofed ACK. Thus, 507-509 in FIG. 5 and blocks 707-709 of FIG. 7 may not be performed in some embodiments. As another example of variation among implementations/embodiments, blocks 711, 713, 715, and 717 can be performed in various orders. Embodiments may perform operations corresponding to blocks 711 and 715 before operations corresponding to blocks 713 and 717. Further, as the technique herein relies on networks, some operations may need to be repeated to deal with delayed/dropped protocol data units for correct operation. For example, an embodiment may choose to re-send an ACK to ascertain that the !RST messages were indeed received and processed correctly at from_host. Specifically, if from_host responds with an RST, it can be assumed that the connection was reset. Instead, if from_host responds with an ACK, the connection is still valid and the process of sending the spoofed RST is repeated.

This description refers to terms that should have well defined meanings within the field of networking and/or computer technology, but can be misinterpreted when the bounds of a reasonable interpretation are stretched. Among many terms, the description refers to a "host" and an "application layer process." In this description and for the claims, a "host" refers to any machine that has networking capability. The term "application layer process" refers to an executing instance of a program or group of programs that are executable by a machine (also referred to as a device) and that operate in accordance with a communications protocol for communications between processes across a network. The description also refers to a "middlebox." A middlebox is a network device with functionality to manipulate traffic traversing the network device, other than forwarding and routing functionality.

As will be appreciated by one skilled in the art, aspects of the inventive subject matter may be embodied as a system, method or computer program product. Accordingly, aspects of the inventive subject matter may take the form of a hardware embodiment, a software embodiment (including firmware, resident software, micro-code, etc.) or an embodiment combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The term "network device" and "host" as used herein comprises any kind of computing system, machine, or device, that has network capability and can be programmed and/or configured in accordance with the inventive subject matter. The description also uses the terms "endpoint," "connection endpoint," "endpoint host," and "connection endpoint host." All of these terms are used interchangeably to refer to an entity that corresponds to an endpoint of a connection established in accordance with a connection based protocol (e.g., TCP). The endpoints are either a source or a destination, depending upon the direction that a protocol data unit is traveling. Also, the description refers to a connection table. Embodiments are not limited to a table type of data structure that hosts information about transport layer connections that traverse a middlebox. This information can be stored in any of a variety of data structures, or even a hardware structure (hardware lookup table). Further, connections (e.g., expressed in terms of addresses and ports of endpoints) may be hosted in multiple structures. An initial hardware structure can be accessed with a hash of an IP address for a from_host. This entry in the hardware structure can reference one or more entries in another data structure, each of which indicate the other endpoint of the connections with the from_host. These entries can further reference other structures that indicate various features or services to be applied to traffic corresponding to the entry(ies).

Figure 8:
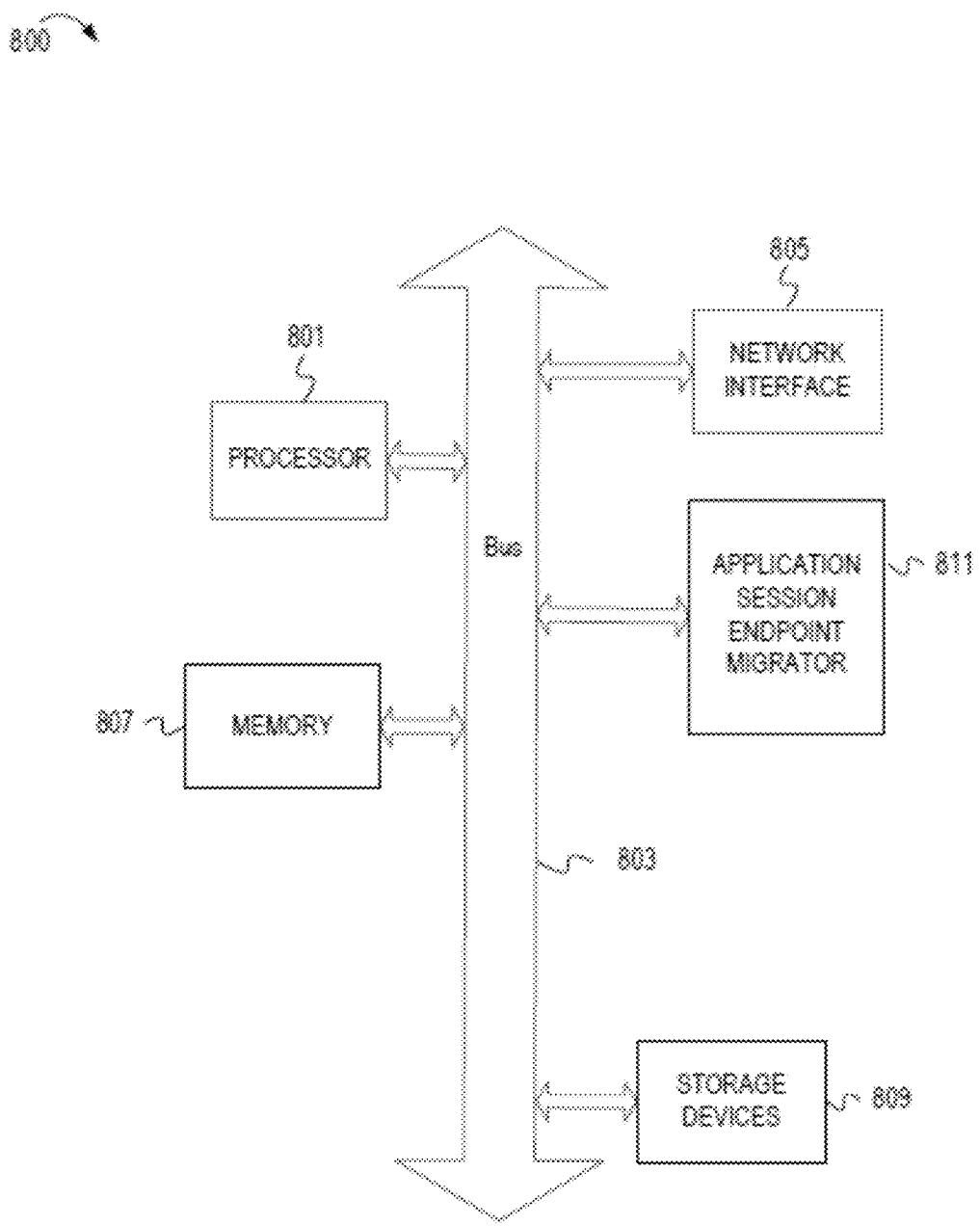
FIG. 8 depicts an example computer system with an application session endpoint migrator.

FIG. 8 depicts an example computer system with a connection endpoint migrator. A computer system 800 includes a processor unit 801 (possibly including multiple processors, multiple cores, multiple hosts, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport® bus, NuBus, etc.), a network interface 805 (e.g., an ATM interface, an Ethernet interface, a Frame Relay interface, SONET interface, wireless interface, a Fiber Channel interface, an Infiniband® interface etc.), and a storage device(s) 809 (e.g., optical storage, magnetic storage, etc.). The computer system 800 also includes an application session endpoint migrator 811. The application session endpoint migrator 811 coordinates network address translation functionality with a transport layer protocol reset mechanism to migrate an application session endpoint with minimal disruption to the application layer process using the corresponding connection. Any one of these functionalities may be partially (or entirely) implemented in hardware and/or on the processing unit 801. For example, the functionality may be implemented with an application specific integrated circuit, a field programmable gate array, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

While the embodiments are described with reference to various implementations and exploitations, it will be understood that these embodiments are illustrative and that the scope of the inventive subject matter is not limited to them. In general, techniques for application session endpoint migration as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   configuring, by a controller, a first network address translation rule to translate a first address of a first server to a second address of a second server for protocol data units being received at the first server from a client device;
   configuring, by the controller, a second network address translation rule to translate the second address of the second server to the first address of the first server for protocol data units being transmitted to the client device from the second server; and
   migrating, by the controller, an endpoint of an application communication session from the first server to the second server using the first and second network address translation rules, the migrating comprising:
      transmitting, by the controller, an acknowledgement message to the first server to appear as though the client device sent the acknowledgment message, the acknowledgement message comprising an acknowledgement identifier not expected by the first server; and
      transmitting, by the controller, a reset message to the first server to appear as though the client device sent the reset message, wherein the reset message is created with a sequence field set to a second acknowledgment identifier indicated in a second acknowledgement message received from the first server.

2. The method of claim 1, wherein the acknowledgement identifier comprises an acknowledgement number.

3. The method of claim 1, comprising:
   transmitting a second reset message to the client device to appear as though the first server sent the second reset message, the second reset message comprising a second sequence field set to a sequence number indicated in the acknowledgement message from the first server.

4. The method of claim 3, comprising creating the second reset message with a field set to indicate the first server as a source of the second reset message.

5. The method of claim 1, comprising creating the acknowledgement message with a field set to indicate the client device as a source of the acknowledgement message.

6. The method of claim 1, wherein the controller comprises software executing on a device.

7. The method of claim 1, wherein
   configuring the first network address translation rule comprises configuring the first network address translation rule to translate a first port of the first server to a second port of the second server.

8. The method of claim 2, wherein the acknowledgement number is outside of a range of acknowledgement numbers expected by the first server.

9. A non-transitory computer readable storage medium having stored thereon instructions for performing a method comprising machine executable code which when executed by at least one machine, causes the machine to:
   configure, by a controller, a first network address translation rule to translate a first address of a first server to a second address of a second server for protocol data units being received at the first server from a client device;

configure, by the controller, a second network address translation rule to translate the second address of the second server to the first address of the first server for protocol data units being transmitted to the client device from the second server; and migrate, by the controller, an endpoint of an application communication session from the first server to the second server using the first translation rule and the second translation rule, comprising:

transmitting, by the controller, an acknowledgement message to the first server to appear as though the client device sent the acknowledgment message, the acknowledgement message comprising an acknowledgement identifier not expected by the first server; and transmitting, by the controller, a reset message to the first server to appear as though the client device sent the reset message, wherein the reset message is created with a sequence field set to a second acknowledgment identifier indicated in a second acknowledgement message received from the first server.

10. The non-transitory computer readable storage medium of claim 9, wherein the acknowledgement message and the second acknowledgment message are in accordance with a transmission control protocol.

11. The non-transitory computer readable storage medium of claim 9, wherein the machine executable code causes the machine to:

transmit a second reset message to the client device to appear as though the first server sent the second reset message as if from the first host, the second reset message comprising a second sequence field set to a sequence number indicated in the acknowledgement message from the first server.

12. The non-transitory computer readable storage medium of claim 11, wherein the machine executable code causes the machine to create the second reset message with a field set to indicate the first server as a source of the second reset message.

13. The non-transitory computer readable storage medium of claim 9, wherein the machine executable code causes the machine to create the acknowledgement message with a field set to indicate the client device as a source of the acknowledgement message.

14. The non-transitory computer readable storage medium of claim 9, wherein the machine executable code causes the machine to:

receive a request for migration, the request specifying a transport layer connection.

15. The non-transitory computer readable storage medium of claim 9, wherein the machine executable code causes the machine to generate a number, as the acknowledgement identifier, outside of a window associated with a transport layer connection.

16. A computing device comprising:

a memory comprising machine executable code for performing a method; and a processor coupled to the memory, the processor configured to execute the machine executable code to cause the processor to:

configure, by the computing device, a first network address translation rule to translate a first address of a first server to a second address of a second server for protocol data units being received at the first server from a client device;

configure, by the computing device, a second network address translation rule to translate the second address of the second server to the first address of the first server for protocol data units being transmitted to the client device from the second server; and migrate, by the computing device, an endpoint of an application communication session from the first server to the second server using the first translation rule and the second translation rule, comprising:

transmitting, by the computing device, an acknowledgement message to the first server to appear as though the client device sent the acknowledgment message, the acknowledgement message comprising an acknowledgement identifier not expected by the first server; and transmitting, by the computing device, a reset message to the first server to appear as though the client device sent the reset message, wherein the reset message is created with a sequence field set to a second acknowledgment identifier indicated in a second acknowledgement message received from the first server.

17. The computing device of claim 16, wherein the machine executable code to cause the processor to:

remove the first network address translation rule and the second network address translation rule based upon a determination that the endpoint is to be migrated from the second server back to the first server.

18. The computing device of claim 17, wherein the machine executable code to cause the processor to transmit a second reset message to the client device to appear as though the first server sent the second reset message, the second reset message comprising a second sequence field set to a sequence number indicated in the acknowledgement message from the first server.

19. The computing device of claim 16, wherein the machine executable code to cause the processor to create the acknowledgement message with a field set to indicate the client device as a source of the acknowledgement message.

20. The computing device of claim 16, wherein the machine executable code to cause the processor to generate a number, as the acknowledgment identifier number, outside of a window associated with a transport layer connection.

* * * * *